US011411999B2

(12) United States Patent
Jin et al.

(10) Patent No.: US 11,411,999 B2
(45) Date of Patent: Aug. 9, 2022

(54) BUILDING SYSTEM WITH DYNAMIC MANUFACTURER USAGE DESCRIPTION (MUD) FILES BASED ON BUILDING MODEL QUERIES

(71) Applicant: Johnson Controls Tyco IP Holdings LLP, Milwaukee, WI (US)

(72) Inventors: Zhongyi Jin, Santa Clara, CA (US); Young M. Lee, Old Westbury, NY (US); Clifford H. Copass, Milwaukee, WI (US); Youngchoon Park, Brookfield, WI (US)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 309 days.

(21) Appl. No.: 16/666,005

(22) Filed: Oct. 28, 2019

(65) Prior Publication Data
US 2020/0137119 A1    Apr. 30, 2020

Related U.S. Application Data

(60) Provisional application No. 62/751,926, filed on Oct. 29, 2018.

(51) Int. Cl.
*H04L 9/40*       (2022.01)
*G06F 30/13*      (2020.01)

(52) U.S. Cl.
CPC .............. *H04L 63/20* (2013.01); *G06F 30/13* (2020.01); *H04L 63/107* (2013.01)

(58) Field of Classification Search
CPC ........ H04L 63/20; H04L 63/107; G06F 30/13
(Continued)

(56) References Cited

U.S. PATENT DOCUMENTS 9,116,978 B2 *   8/2015   Park ................... G06F 16/3349
9,811,249 B2    11/2017   Chen et al.
(Continued)

FOREIGN PATENT DOCUMENTS

AU    2019226217 A1    11/2020
AU    2019226264 A1    11/2020
(Continued)

OTHER PUBLICATIONS

Lear et al., Manufacturer Usage Description Specification, Internet Engineering Task Force (IETF), Mar. 2019, 60 pages, ISSN: 2070-1721.

*Primary Examiner* — Kambiz Zand
*Assistant Examiner* — Aubrey H Wyszynski
(74) *Attorney, Agent, or Firm* — Foley & Lardner LLP

(57) ABSTRACT

A building security system for a building includes one or more memory devices configured to store instructions. The instructions, when executed on one or more processors, cause the one or more processors to receive an access policy data structure for a building device, the access policy data structure indicating access policies for interactions of one or more other building devices with the building device, wherein the access policy data structure identifies the one or more other building devices with one or more building model queries, generate a dynamic access policy data structure for the building device by resolving the one or more building model queries with a building model to identify the one or more other building devices, wherein the dynamic access policy data structure comprises the access policies, and implement the access policies of the dynamic access policy data structure based on the one or more other building devices.

20 Claims, 8 Drawing Sheets

(58) Field of Classification Search
USPC .......................................................... 726/1
See application file for complete search history.

(56) References Cited

U.S. PATENT DOCUMENTS

| | | | |
|---|---|---|---|
| 10,171,297 B2 | 1/2019 | Stewart et al. | |
| 10,417,451 B2* | 9/2019 | Park | H04L 63/101 |
| 10,564,993 B2 | 2/2020 | Deutsch et al. | |
| 10,735,470 B2* | 8/2020 | Vidas | H04L 63/20 |
| 10,760,815 B2 | 9/2020 | Janakiraman et al. | |
| 10,762,475 B2 | 9/2020 | Song et al. | |
| 10,824,120 B2 | 11/2020 | Ahmed | |
| 10,841,164 B2* | 11/2020 | Kampanakis | H04L 43/08 |
| 10,845,771 B2 | 11/2020 | Harvey | |
| 10,921,760 B2 | 2/2021 | Harvey | |
| 10,969,133 B2 | 4/2021 | Harvey | |
| 11,041,650 B2 | 6/2021 | Li et al. | |
| 11,054,796 B2 | 7/2021 | Holaso | |
| 2008/0183973 A1* | 7/2008 | Aguilera | G06F 11/2094 |
| | | | 711/147 |
| 2010/0268722 A1* | 10/2010 | Yalamanchi | G06F 16/9024 |
| | | | 707/759 |
| 2013/0338970 A1 | 12/2013 | Reghetti | |
| 2015/0207888 A1* | 7/2015 | Swanson | G06F 16/13 |
| | | | 709/219 |
| 2016/0125327 A1* | 5/2016 | Lamoureux | G06Q 50/14 |
| | | | 705/6 |
| 2016/0247129 A1 | 8/2016 | Song et al. | |
| 2016/0260063 A1 | 9/2016 | Harris et al. | |
| 2016/0357521 A1 | 12/2016 | Zhang et al. | |
| 2018/0152544 A1* | 5/2018 | Monczynski | H04L 63/145 |
| 2018/0356775 A1 | 12/2018 | Harvey | |
| 2018/0359111 A1 | 12/2018 | Harvey | |
| 2019/0121801 A1 | 4/2019 | Jethwa et al. | |
| 2019/0253319 A1* | 8/2019 | Kampanakis | G06N 5/025 |
| 2019/0377306 A1 | 12/2019 | Harvey | |
| 2020/0336328 A1 | 10/2020 | Harvey | |
| 2020/0348632 A1 | 11/2020 | Harvey | |
| 2020/0387576 A1 | 12/2020 | Brett et al. | |
| 2020/0396208 A1 | 12/2020 | Brett et al. | |
| 2021/0043221 A1 | 2/2021 | Yelchuru et al. | |
| 2021/0325070 A1 | 10/2021 | Endel et al. | |
| 2021/0342961 A1 | 11/2021 | Winter et al. | |
| 2022/0121965 A1 | 4/2022 | Chatterji et al. | |

FOREIGN PATENT DOCUMENTS

| | | |
|---|---|---|
| AU | 2019351573 A1 | 5/2021 |
| EP | 3 268 821 B1 | 1/2018 |
| WO | WO-2018/132112 A1 | 7/2018 |
| WO | WO-2020/061621 A1 | 4/2020 |
| WO | WO-2022/042925 A1 | 3/2022 |

\* cited by examiner

Example Building Modeled in Brick

```
"ietf-access-control-list:access-lists" : {
  "acl" : [ {
    "name" : "from-ipv4-jci_dlink_cam2",
    "type" : "ipv4-acl-type",
    "aces" : {
      "ace" : [ {
        "name" : "from-ipv4-jci_dlink_cam2-0",
        "matches" : {
          "ietf-mud:mud" : {
            "local-networks" : [ null ]
          },
          "ipv4" : {
            "protocol" : 17,
            "destination-ipv4-network" :
          },
          "udp" : {
            "destination-port" : {
              "operator" : "eq",
              "port" : 1900
            }
          }
        },
        "actions" : {
          "forwarding" : "accept"
        }
      },
```
800 ⟵

```
SELECT ?room ?sensor WHERE {
  ?sensor rdf:type/rdfs:subClassOf+ brick:Temperature_Sensor .
  ?sensor bf:hasLocation ?room .
  ?room   rdf:type/rdfs:subClassOf+ brick:Room .
}
```
802 ⟵

BUILDING SYSTEM WITH DYNAMIC MANUFACTURER USAGE DESCRIPTION (MUD) FILES BASED ON BUILDING MODEL QUERIES

CROSS-REFERENCE TO RELATED PATENT APPLICATION

This application claims the benefit of and priority to U.S. Provisional Patent Application No. 62/751,926 filed Oct. 29, 2018, the entirety of which is incorporated by reference herein.

BACKGROUND

The present disclosure relates generally to building systems that operate a building. The present disclosure relates more particularly to security for building devices of the building systems.

Internet of Things (IoT) security is critical for smart-building applications. The Manufacturer Usage Description (MUD) specification can be implemented in the building systems to implement security. More specifically, the MUD specification can serve as a foundation for network-level device-to-device access control. However, the MUD specification is static and is not easily scalable for buildings with different building system configurations. Furthermore, the MUD specification does not adapt to buildings where the building systems change over time.

The Domain Name Service (DNS) is one technique to abstract and specify communication for end-points. However, DNS does not fix the issues of the static nature of the MUD specification since the DNS is not scalable for local area networks (LAN) across buildings and/or building sites. Furthermore, the DNS is not scalable as new devices are added and/or removed and is not directly mapped to HVAC and/or smart-building applications.

SUMMARY

One implementation of the present disclosure is a building security system for a building. The building security system includes one or more memory devices configured to store instructions that, when executed on one or more processors, cause the one or more processors to receive an access policy data structure for a building device, the access policy data structure indicating access policies for interactions of one or more other building devices with the building device, wherein the access policy data structure identifies the one or more other building devices with one or more building model queries, generate a dynamic access policy data structure for the building device by resolving the one or more building model queries with a building model to identify the one or more other building devices, wherein the dynamic access policy data structure includes the access policies, and implement the access policies of the dynamic access policy data structure based on the one or more other building devices.

In some embodiments, the access policies indicate that the building device should allow a first type of access from at least some of the one or more other building devices to a first network port of the building device and the building device should deny a second type of access from at least some of the one or more other building devices on a second network port of the building device.

In some embodiments, the instructions cause the one or more processors to implement the access policies by implementing one or more network configurations on at least one of the building device, the one or more other building devices, or one or more other network devices associated with a network of the building device.

In some embodiments, the access policy data structure and the dynamic access policy data structure are both manufacturer usage description (MUD) files.

In some embodiments, the building model is a BRICK building model and the one or more building model queries are one or more BRICK building model queries.

In some embodiments, the instructions cause the one or more processors to receive, via a network, a resource location identifier from the building device, wherein the resource location identifier is associated with the access policy data structure, send, via the network, a request to a file server for the access policy data structure, the request including the resource location identifier, receive, via the network from the file server, the access policy data structure in response to having sent the request to the file server, and generate the dynamic access policy data structure based on the received access policy data structure in response to a reception, via the network from the file server, of the access policy data structure.

In some embodiments, the instructions of the one or more memory devices cause the one or more processors to detect a change to the building model and regenerate the dynamic access policy data structure for the building device by resolving the one or more building model queries with the building model to identify at least some of the one or more other building devices or one or more new building devices.

In some embodiments, the change to the building model includes at least one of the one or more new building devices being added to the building model, one of the one or more other building devices being removed from the building model, or a first building device of the one or more other building devices being replaced with a second building device.

In some embodiments, the building model includes indications of entities including at least one of one or more building device entities, one or more building device type entities, one or more equipment point entities, or one or more space entities, wherein the building model further includes relationships between the entities.

In some embodiments, the one or more building model queries identify the one or more other building devices by identifying one or more of the entities with one or more query parameters.

In some embodiments, the one or more query parameters identify the one or more of the entities by specifying that the one or more of the entities are associated with a particular entity of the entities. In some embodiments, the instructions cause the one or more processors to resolve the one or more building model queries with the building model and the one or more query parameters to identify the one or more other building devices by identifying that the one or more of the entities that are associated with the particular entity of the entities.

Another implementation of the present disclosure is a method of security for a building. The method includes receiving, by one or more processing circuits, an access policy data structure for a building device, the access policy data structure indicating access policies for interactions of one or more other building devices with the building device, wherein the access policy data structure identifies the one or more other building devices with one or more building model queries, generating, by the one or more processing circuits, a dynamic access policy data structure for the building device by resolving the one or more building model queries with a building model to identify the one or more other building devices, wherein the dynamic access policy data structure includes the access policies, and implementing, by the one or more processing circuits, the access policies of the dynamic access policy data structure based on the one or more other building devices.

In some embodiments, the access policy data structure and the dynamic access policy data structure are both manufacturer usage description (MUD) files.

In some embodiments, the building model is a BRICK building model and the one or more building model queries are one or more BRICK building model queries.

In some embodiments, the method includes receiving, by the one or more processing circuits, via a network, a resource location identifier from the building device, wherein the resource location identifier is associated with the access policy data structure, sending, by the one or more processing circuits, via the network, a request to a file server for the access policy data structure, the request including the resource location identifier, receiving, by the one or more processing circuits, via the network from the file server, the access policy data structure in response to having sent the request to the file server, and generating, by the one or more processing circuits, the dynamic access policy data structure based on the received access policy data structure in response to a reception, via the network from the file server, of the access policy data structure.

In some embodiments, the method includes detecting, by the one or more processing circuits, a change to the building model and regenerating, by the one or more processing circuits, the dynamic access policy data structure for the building device by resolving the one or more building model queries with the building model to identify at least some of the one or more other building devices or one or more new building devices.

In some embodiments, the building model includes indications of entities including at least one of one or more building device entities, one or more building device type entities, one or more equipment point entities, or one or more space entities, wherein the building model further includes relationships between the entities.

In some embodiments, the one or more building model queries identify the one or more other building devices by identifying one or more of the entities with one or more query parameters.

In some embodiments, the one or more query parameters identify the one or more of the entities by specifying that the one or more of the entities are associated with a particular entity of the entities. In some embodiments, the method further includes resolving, by the one or more processing circuits, the one or more building model queries with the building model and the one or more query parameters to identify the one or more other building devices by identifying that the one or more of the entities that are associated with the particular entity of the entities.

Another implementation of the present disclosure is a building network security system of a building. The building network security system includes a building device configured to perform one or more building functions for the building and one or more processing circuits configured to receive an access policy data structure for the building device, the access policy data structure indicating access policies for interactions of one or more other building devices with the building device, wherein the access policy data structure identifies the one or more other building devices with one or more building model queries, resolving the one or more building model queries with a building model to identify the one or more other building devices, wherein the access policy data structure includes the access policies, and implement the access policies of the access policy data structure based on the one or more other building devices.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 8 is a dynamic MUD file for use with the dynamic MUD manager illustrated in FIG. 3 including MUD policies and building model queries, according to an exemplary embodiment.

DETAILED DESCRIPTION

Overview

The present disclosure relates to systems and methods for implementing the MUD specification in smart buildings. Referring generally to the FIGURES, systems and methods for implementing a dynamic MUD file using a building model is shown, according to an exemplary embodiment. The system described herein can be configured to enable the MUD standard for smart building IoT security. A MUD policy is generally not scalable when applied to smart buildings since a MUD policy is static and cannot adapt to buildings with different system configurations and/or when devices are added or removed from a building. A dynamic MUD policy can also be used during the operation of smart buildings. Smart building applications often require fine grain access control of IoT devices. Hard coding the access control list in MUD file is not often feasible and scalable for smart buildings.

In this regard, the building system and method as describe herein are configured to implement a dynamic MUD policy, in some embodiments. The building system can implement a MUD file that includes building model queries instead of static definitions of equipment. The queries included within the MUD file can reference devices of a building model. Since the queries of the MUD file reference the building model, as the building model changes, the MUD file dynamically adapts to the building model. Examples of building models that can be utilized by the building system may be the BRICK schema but may be any type of building model. Furthermore, the policy management MUD file can be any type of policy management schema.

The software limitations of the MUD specification are resolved with the systems and methods of the present disclosure. Specifically, the incorporation of the building model queries into the static definitions of MUD as performed by the systems and methods discussed herein allow for MUD to act dynamically instead of statically. This allows for the MUD specification to be implemented in network security systems (e.g., IoT building systems) where the type and number of devices are dynamic. Normally, static MUD files would not be suitable for dynamic network security systems such as a building. In this regard, the dynamic MUD files generated herein improve network security and enable the deployment of MUD based security to building systems.

Building with Building Systems

Figure 1:
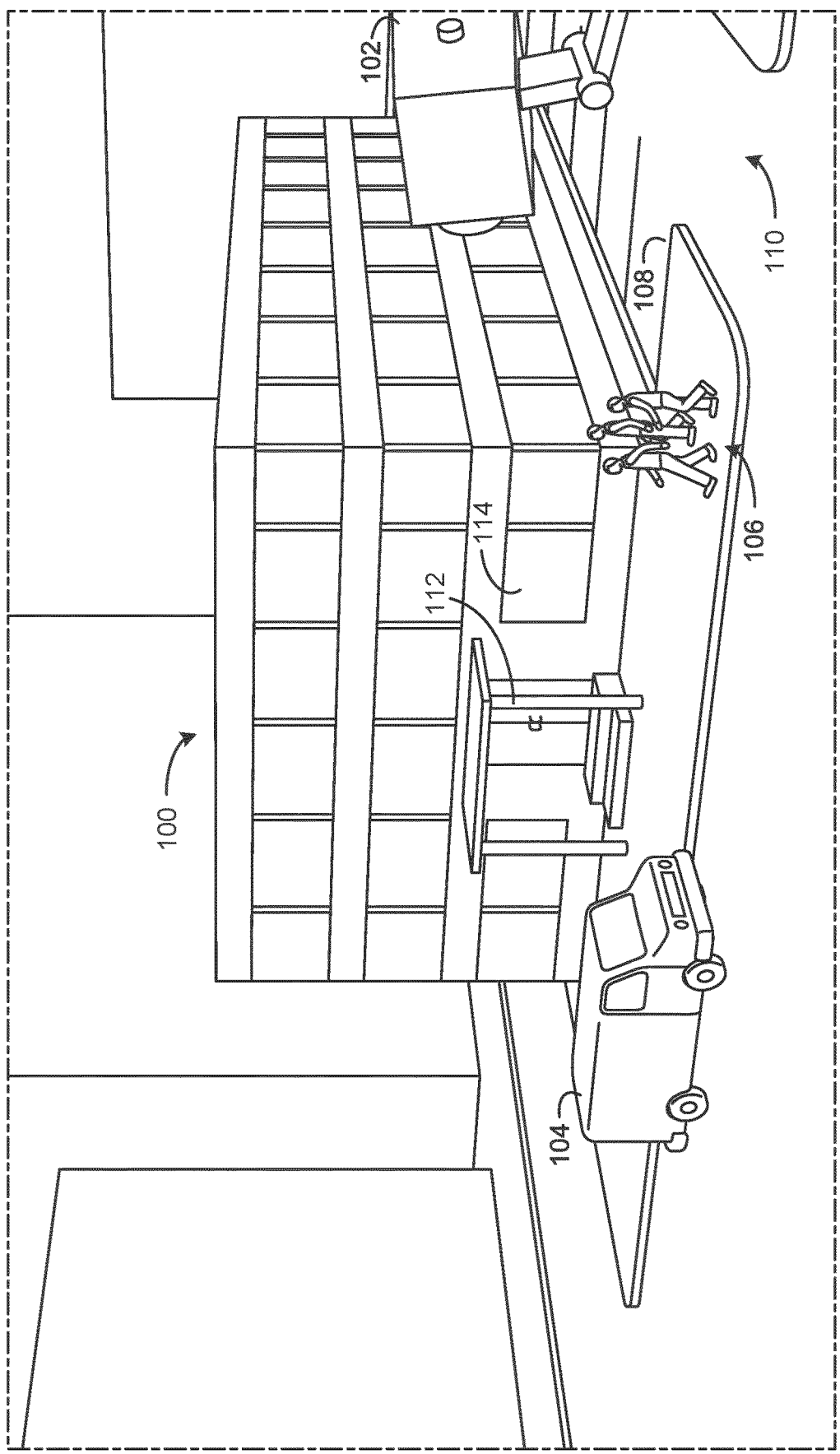
FIG. 1 is a perspective view schematic drawing of a building with building systems, according to an exemplary embodiment.

Referring now to FIG. 1, a building 100 with a security camera 102 and a parking lot 110 is shown, according to an exemplary embodiment. The building 100 is a multi-story commercial building surrounded by or near the parking lot 110 but can be any type of building in some embodiments. The building 100 can be a school, a hospital, a store, a place of business, a residence, an apartment complex, a hotel, an office building, etc. The building 100 may be associated with the parking lot 110.

Both the building 100 and the parking lot 110 are at least partially in the field of view of the security camera 102. In some embodiments, multiple security cameras 102 may be used to capture the entire building 100 and parking lot 110 not in (or in to create multiple angles of overlapping or the same field of view) the field of view of a single security camera 102. The parking lot 110 can be used by one or more vehicles 104 where the vehicles 104 can be either stationary or moving (e.g. delivery vehicles). The building 100 and parking lot 110 can be further used by one or more pedestrians 106 who can traverse the parking lot 110 and/or enter and/or exit the building 100. The building 100 may be further surrounded or partially surrounded by a sidewalk 108 to facilitate the foot traffic of one or more pedestrians 106, facilitate deliveries, etc. In other embodiments, the building 100 may be one of many buildings belonging to a single industrial park, shopping mall, or commercial park having a common parking lot and security camera 102. In another embodiment, the building 100 may be a residential building or multiple residential buildings that share a common roadway or parking lot.

The building 100 is shown to include a door 112 and multiple windows 114. An access control system can be implemented within the building 100 to secure these potential entrance ways of the building 100. For example, badge readers can be positioned outside the door 112 to restrict access to the building 100. The pedestrians 106 can each be associated with access badges that they can utilize with the access control system to gain access to the building 100 through the door 112. Furthermore, other interior doors within the building 100 can include access readers. In some embodiments, the doors are secured through biometric information, e.g., facial recognition, fingerprint scanners, etc. The access control system can generate events, e.g., an indication that a particular user or particular badge has interacted with the door. Furthermore, if the door 112 is forced open, the access control system, via door sensor, can detect the door forced open (DFO) event.

The windows 114 can be secured by the access control system via burglar alarm sensors. These sensors can be configured to measure vibrations associated with the window 114. If vibration patterns or levels of vibrations are sensed by the sensors of the window 114, a burglar alarm can be generated by the access control system for the window 114.

The building 100 can further include HVAC systems. For example, waterside systems, airside systems, building management systems, and/or various other HVAC systems can be included within the building 100. For example, equipment such as chillers, boilers, rooftop units, air handler units, thermostats, sensors, actuators, dampers, valves, and other equipment can be implemented within the building 100 to control the environmental conditions of the building 100. Examples of building equipment that can be implemented within the building 100 can be found in U.S. patent application Ser. No. 16/048,052 filed Jul. 27, 2018, the entirety of which is incorporated by reference herein.

Dynamic MUD Specification

Figure 2:
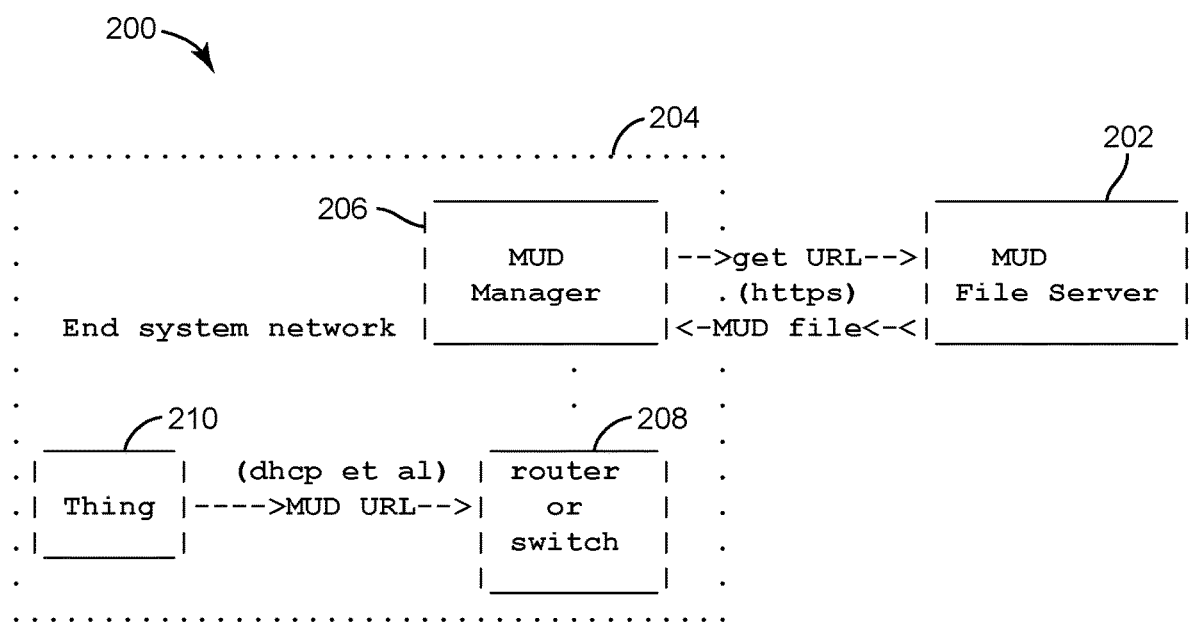
FIG. 2 is a general block diagram of a manufacturer usage description (MUD) system that can be implemented in the building illustrated in FIG. 1, according to an exemplary embodiment.

Referring now to FIG. 2, a block diagram of a system 200 is shown implementing MUD policies, according to an exemplary embodiment. The system 200 can be configured to implement IoT security which is critical for a building. The MUD Specification acts as the foundation for network-level device-to-device access control and can be utilized to implement security for the devices of the building 100 as described with reference to FIG. 1. The MUD specification is described in further detail in *Manufacturer Usage Description Specification*, draft-ietf-opsawg-mud-22, 25 May 2018, the entirety of which is incorporated by reference herein. The MUD specification is implemented with a MUD file, in some embodiments. The MUD file defines access control policies in a standardized schema, in some embodiments.

The MUD file defines, in some embodiments, what sort of communications a device is designed to allow. For example, the MUD file can define what sorts of communication devices of a building, e.g., thing 210, are allowed with other devices of the building. Examples of thing 210 include any type of device or asset (e.g., controllers, thermostats, switches, sensors, etc.). In the case that the thing 210 is a printer, the MUD file could define the following:

Printer-A allows all incoming access to port IPP or port LPD (for printing)
Printer-A allows local incoming access to port https (for printer management)
Printer-A denies all other access The MUD file is stored on a server, e.g., the MUD file server 202 while a MUD manager 206 is configured to provide a standard way to access, manage, and/or enforce the MUD file and/or the MUD policies of the MUD file, in some embodiments. The thing 210 can be configured to emit a MUD URL to an end system network 204. The MUD URL may be a uniform resource locator (URL) that can be used by the MUD manager 206 to receive a MUD file associated with the thing 210. The end system network 204 is a group of building devices (e.g., the thing 210), the router or switch 208, or other network components (e.g., routers, switches, transceivers, coordinators, etc.) for implementing LANs, wide area networks (WANs), MAN, the Internet, Zigbee, Bluetooth, CAN, BACnet, etc.), in some embodiments.

The router or switch 208 receives the emitted URL from the thing 210 and forwards the URL to the MUD manager 206 in some embodiments. In some embodiments, the MUD manager 206 receives the MUD URL from the thing 210 directly or from another router or switch. The MUD manager 206 can be configured to retrieve a MUD file for the thing 210 based on the MUD URL if the MUD manager 206 does not already store a copy of a MUD file for the thing 210. In some embodiments, the MUD manager 206 queries an administrator or administrator device for permission to add the thing 210 to the end system network 204 or the associated policy for the thing 210 defined by the MUD file for the thing 210.

In response to receiving the MUD file and/or in response to receiving permission to instantiate the MUD file by the administrator, the MUD manager 206 can be configured to implement policies in the end system network 204 based on the MUD file received from the MUD file server 202. The MUD manager 206 can be configured to instantiate local configurations for the end system network 204 based on the MUD file for the thing 210. In some embodiments, the MUD manager 206 configures the thing 210 and/or the switch nearest the thing 210, the router or switch 208 based on the policies of the MUD file received from the MUD file server 202 although other systems of the end system network 204 can also be configured based on the MUD file. When the thing 210 disconnects from the end system network 204, the MUD manager 206 can remove the policies for the thing 210 from the end system network 204, e.g., implement new configurations.

Still referring to FIG. 2, a unique set of challenges may be present for the system 200 when implementing MUD based security when the system 200 is implemented in a smart building. Smart building applications require fine grain access control of IoT devices. For example, considering a room controller that has lighting, security, HVAC, and occupancy indication for the room, the light switches in the room should be able to turn on the lights as well as the emergency evacuation system and the building operator terminal. Room access is through a local credential reader along with fire department people or a police override terminal. HVAC should be automatic based on occupancy, but also allow remote override from the building operator terminal. Remote fresh air intake may depend on the occupancy sensor values in multiple different rooms. Control of a remote air handler may depend on what the collection of room controller HVAC functions is doing. Hard coding the access control in a MUD file is not feasible and scalable for smart buildings since the equipment of the smart buildings are dynamic and may require complex and dynamic configurations based on the other equipment of the building.

Figure 3:
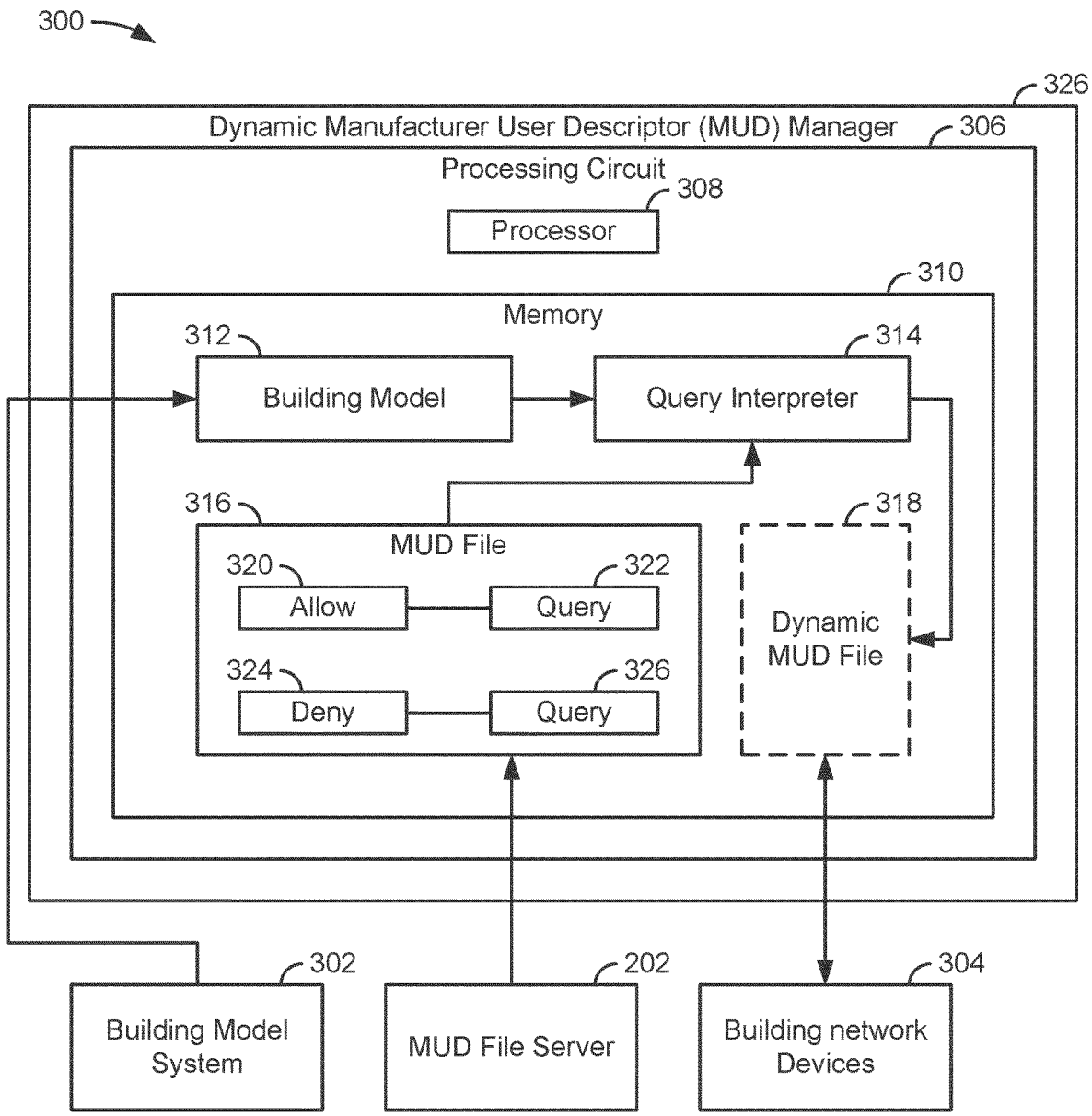
FIG. 3 is a block diagram of a dynamic MUD manager that can be implemented in the MUD system illustrated in FIG. 2 to generate and implement dynamic MUD files based on a building model, according to an exemplary embodiment.

Referring now to FIG. 3, a dynamic MUD manager 326 is shown for implementing a dynamic MUD file based on a building model, according to an exemplary embodiment. The dynamic MUD manager 326 may be the same as and/or similar to the MUD manager 206 as described with reference to FIG. 2. The dynamic MUD manager 326 is shown to include a processing circuit 306. The processing circuit 306 includes a processor 308 and a memory 310. The dynamic MUD manager 326 can be implemented locally within a building and/or remote from a building. The dynamic MUD manager 326 can be implemented in a server, multiple servers, a cloud computing platform (e.g., MICROSOFT AZURE, AMAZON WEB SERVICES, etc.), a controller, via microservices across multiple computing devices, and/or on (or distributed across) any other computing device or system. In some embodiments, the dynamic MUD manager 326 is implemented via the processing circuit 306 (e.g., a memory and/or a processor) and/or implemented across multiple processing circuits 306 (e.g., multiple memories and/or processors).

The processor 308 can be a general purpose processor, an application specific integrated circuit (ASIC), one or more field programmable gate arrays (FPGAs), a group of processing components, or other suitable electronic processing components. Processor 308 can be communicatively coupled to the memory 310. The memory 310 can include one or more devices (e.g., memory units, memory devices, storage devices, etc.) for storing data and/or computer code for completing and/or facilitating the various processes described in the present disclosure. The memory 310 can include random access memory (RAM), read-only memory (ROM), hard drive storage, temporary storage, non-volatile memory, flash memory, optical memory, or any other suitable memory for storing software objects and/or computer instructions. The memory 310 can include database components, object code components, script components, or any other type of information structure for supporting the various activities and information structures described in the present disclosure. The memory 310 can be communicably connected to the processor 308 via the processing circuit 306 and can include computer code for executing (e.g., by the processor 308) one or more processes described herein.

The dynamic MUD manager 326 is shown to communicate with a building model system 302, the MUD file server 202 as described with reference to FIG. 2, and building network devices 304. The building model system 302 can be a system separate from and/or integrated with the dynamic MUD manager 326 configured to generate a building model 312 that describes the building network devices 304 and/or multiple buildings associated with the building network devices 304. The building model system 302 can generate, manage, and/or receive the building model 312. In some embodiments, the building model system 302 provides the building model 312 to the dynamic MUD manager 326 or otherwise allows the dynamic MUD manager 326 access to the building model 312. The building model 312 can be a BRICK based data structure indicating multiple entities (e.g., the building network devices 304) and relationships between the entities. The building model 312 is described in further detail in FIG. 6.

BRICK is a unified semantic representation of entity relations in buildings. For example, type, point to equipment, equipment to equipment, spatial, etc. entities may be represented in BRICK. BRICK further defines entity relations in BRICK-based building models that can be queried in software. For example, a query may be, "find all devices connected to HVAC Zone of Room-101." SPARQL is a commonly used query language that can implement queries for the building model 312. Brick based building models (or other building models) can be created and maintained as a part of the process of building commissioning and operation of a building.

The building network devices 304 may be building equipment devices e.g., the building equipment described with reference to FIG. 1. Furthermore, the building network devices 304 can include the thing 210, the router or switch 208, and/or any other device or component of the end system network 204 as described with reference to FIG. 2.

The dynamic MUD manger 326 can be configured to capture and manage dynamic device-to-device access control policies using the building model 312. The dynamic MUD manager 326 can be configured to specify device-to-device access control policies using static queries, allowing MUD files to act dynamically. For example, MUD file policies with building model queries can include:

Thermostat-A allows all incoming access from brick_query {VAV devices controlling the same HVAC Zone as Thermostat-A}

Thermostat-A allows all incoming access from brick_query {administrative terminal devices of this building}

The queries can be created based on type, point to equipment relation, equipment to equipment relation, and/or spatial relation. The dynamic MUD manager 326 can implement control logic and data flow logic for a dynamic MUD file with building model queries so that there is no need to hard code references to specific devices with the MUD file. Furthermore, the dynamic MUD manager 326 can be configured to generate a dynamic MUD policy by interpreting the static query against the building model 312.

The memory 310 is shown to include the building model 312, a MUD file 316, a query interpreter 314, and a dynamic MUD file 318. The dynamic MUD manager 326 can be configured to receive (or otherwise remotely query), the building model 312 from the building model system 302. The dynamic MUD manager 326 can further be configured to receive (or otherwise remotely query), the MUD file 316 from the MUD file server 202. The MUD file 316 can be requested from the MUD file server 202 by the dynamic MUD manager 326 via a particular URL associated with the MUD file 316. The URL can be received by the dynamic MUD manager 326 from a particular device of the building network devices 304 that emits the URL to the dynamic MUD manager 326 or otherwise to a router or switch that pushes the URL emission to the dynamic MUD manager 326. The operations for MUD file requesting and/or implementation is described in greater detail in FIG. 2.

The MUD file 316 received by the dynamic MUD manager 326 can include semantic permissions, e.g., allow 320 and deny 324. These permissions may define what a type of communication and/or operation is allowed or denied by a particular device of the building network devices 304. Each of the allow 320 and the deny 324 permissions are associated with queries 322 and 326 respectively. The queries 322 and 326 may be semantic queries of particular entities within the building model 312. The queries can be such that, when resolved, identify a particular device or group of devices. The queries can include particular parameters that define particular entities or relationships to the particular entities. In this regard, the parameters can be "all devices within zone A" where the particular entity is zone A and the relationship is devices within (the zone A).

The query interpreter 314 can be configured to receive the building model 312 and the MUD file 316. The query interpreter 314 can interpret the queries 322 and 326 against the building model 312 to identify particular entities and/or groups of entities based on the parameters of the queries. The result of interpreting the queries 322 and 326 may result in the generation of the dynamic MUD file 318 which may identify not only the permissions 320 and 324 but also particular building devices to implement the permissions as identified by resolving the queries 322 and 326. The dynamic MUD manager 326 can be configured to implement the MUD file 318 in the building network devices 304 by implementing configurations defined by the dynamic MUD file 318 in the building network devices 304. Implementing configurations of a MUD file are described in greater detail in FIG. 2.

In some embodiments, the query interpreter 314 can be configured to determine when the building model 312 changes and/or is updated. In some embodiments, the query interpreter 314 receives an indication of an update from the building model system 302, compares a version number of the building model 312 to an old version number stored by the query interpreter 314, etc. In response to determining that the building model 312 has changed, the query interpreter 314 can be configured to regenerate the dynamic MUD file 318. Since the building model 312 has changed, the queries 322 and 326 when resolved with the building model 312 may return different entities and/or groups of entities. In this regard, as the query interpreter 314 generates the dynamic MDU file 318, the dynamic MUD manager 326 can implement updates to the policies of the dynamic MUD file 318 in the building network devices 304 (if new permission configurations are required).

Figure 4:
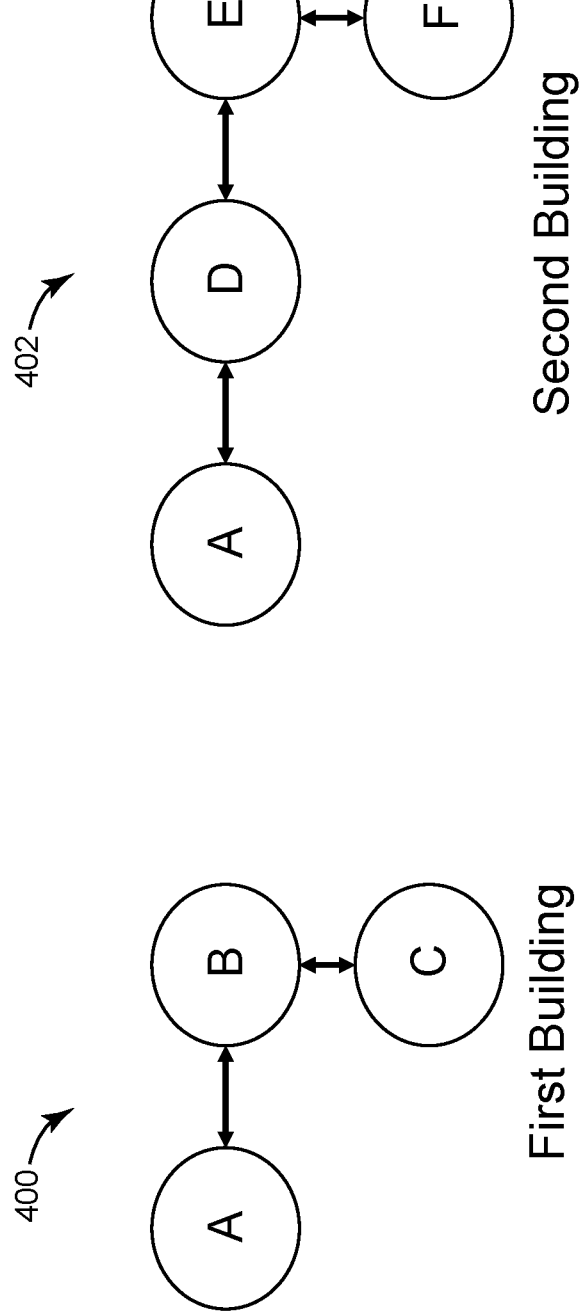
FIG. 4 is a block diagram of building models for two different buildings illustrating that MUD policies of a static MUD file are not scalable across multiple buildings and that MUD policies of the dynamic MUD file are scalable across multiple buildings, according to an exemplary embodiment.

Referring now to FIG. 4, building models for two different buildings are shown, according to an exemplary embodiment. A static MUD specification works well for a static policy. For example, Thermostat-A allows incoming access from "www.xyz.com". In this regard, the same policy for a device could be used in any deployment of the device, e.g., in different buildings that have the exact system equipment setup. However, the static MUD policy when applied to smart buildings may not operate properly. Building networks (LANs) are dynamic and require dynamic MUD policy. For example, to specify the access policy from device-A to a particular end device or a particular device type (device-C and device-F respectively), two different MUD files would need to be generated.

For the first building 400, device-A allows incoming access on port 80 of device-A from device-C. In the second building, device-A allows incoming access on port 80 of device-A from device-F. These two different configurations of the building 400 and the building 402 require two separate MUD files. However, if a dynamic MUD file is implemented as described with reference to FIG. 3, only one MUD file could be implemented across both the first building 400 and the second building 402 since the building model queries could be resolved to identify device-C or device-F.

Figure 5:
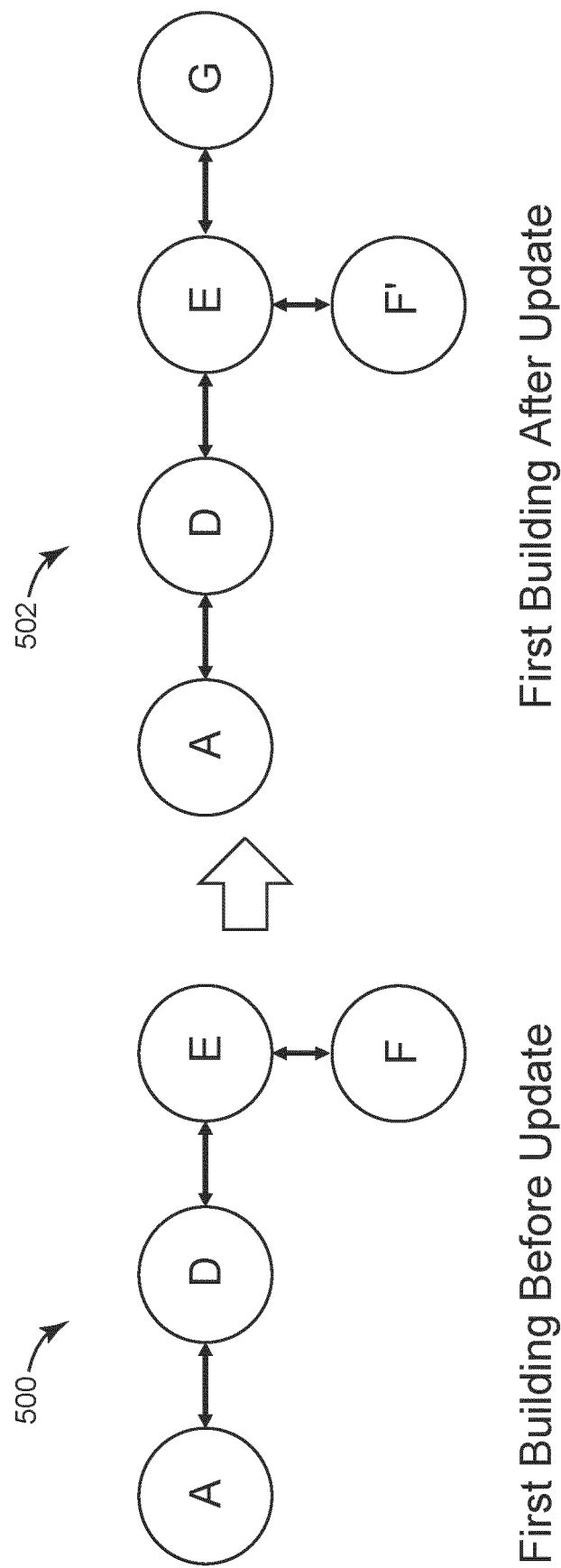
FIG. 5 is a block diagram of building models for a building after equipment is added for the building illustrating that MUD policies of a static MUD file are not adaptable for building equipment updates and that MUD policies of the dynamic MUD file are adaptable for equipment updates, according to an exemplary embodiment.

Referring now to FIG. 5, building models for a building after equipment is added for the building is shown, according to an exemplary embodiment. The building configuration 500 is shown at a first point in time where device-A, device-D, device-E, and device-F are installed and connected in the building. However, at a second point in time after the first point in time, devices can be replaced, and/or new devices can be added. Building configuration 502 illustrates a new device being added, device-G. Furthermore, the configuration 502 illustrates the device-F of the configuration 500 being replaced with a new device, device-F'. Since new devices are installed within buildings over time and devices are replaced when devices break, the dynamic MUD policy as described with reference to FIG. 3 may be important for adapting to changes in the building.

Since the dynamic MUD file 318 as described with reference to FIG. 3 is based on queries instead of being hardcoded, even though device-F has changed to device-F', the query, when resolved with the building model 312, may indicate either device-F and/or device-F' based on the building model 312. This allows devices to be replaced without requiring the MUD file 318 to be redefined manually. Furthermore, the query of the MUD file 318 can be such that all devices connected to device-E can write data to the device A. In some embodiments, even though device-G may not be present in the building at the first point in time, at the second point in time when the device-G is added to the building, the query may be resolved with the building model 312 to identify the permissions to both the device-F' and the device-G even though the device-G is not hard coded into the MUD file. In this regard, the MUD file can operate at either the first point in time or the second point in time when devices are replaced or added without requiring manual reconfiguration of the MUD file. Similar operations can be implemented when devices are removed from a building, i.e., the MUD file policies can adapt to devices being removed Referring now to FIG. 6 the building model 312 as described with reference to FIG. 3 is shown in greater detail, according to an exemplary embodiment. The building model 312 is shown to include multiple entities representing particular physical building devices. The entities include a luminaire, a light zone, a first room, a second room, an HVAC zone, a temperature sensor, a damper, a VAV, an AHU, and a power meter. Although the entities shown in the building model 312 represent HVAC devices and spaces, the entities can also represent security devices, fire systems, the vehicles of FIG. 1, etc. The building model 312 further includes relational entities. The luminaire "feeds" the light zone while the lighting zone "hasPart" first room and second room. The HVAC zone "hasPart" the first room and "hasPoint" the temperature sensor. The VAV "feeds" the HVAC zone and "hasPoint" the temperature sensor and "hasPart" the damper. Finally, the AHU "feeds" the VAV and "hasPoint" the Power Meter.

Figure 6:
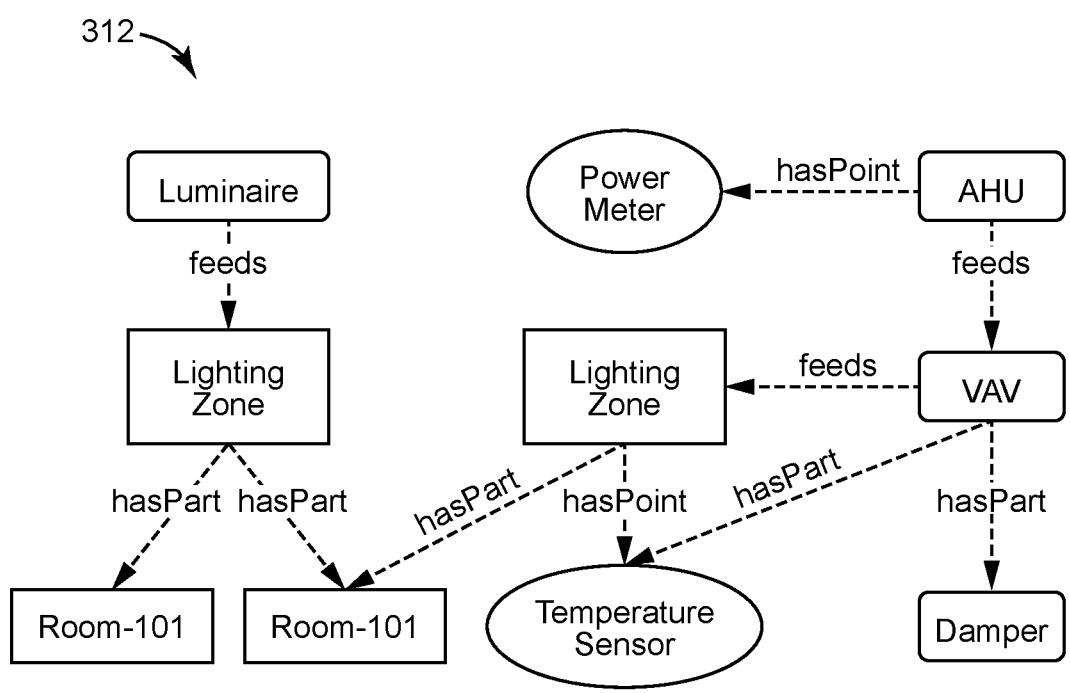
FIG. 6 is a block diagram of the building model illustrated in FIG. 3 shown in greater detail to include multiple entities and relationships between entities, according to an exemplary embodiment.

This representation of FIG. 6 can be implemented with queries that can be resolved to identify particular entities of the building model 312. For example, a query (e.g., a query of a MUD file) can indicate all lighting devices associate with the lighting zone (i.e., parameters that define a particular entity and relationships to the particular entity). The query interpreter 314 can interpret the query to identify the luminaire shown in FIG. 6 since the luminaire feeds the lighting zone. If the luminaire changes or another luminaire is added for the lighting zone, the queries can resolve to adapt to the changes of the building model 312. Further details of entity representations of buildings and systems that can generate and manage the entity representations (e.g., the building model system 302 as described with reference to FIG. 3) are described in further detail in U.S. patent application Ser. No. 16/048,052 filed Jul. 27, 2018, the entirety of which is incorporated by reference herein.

Figure 7:
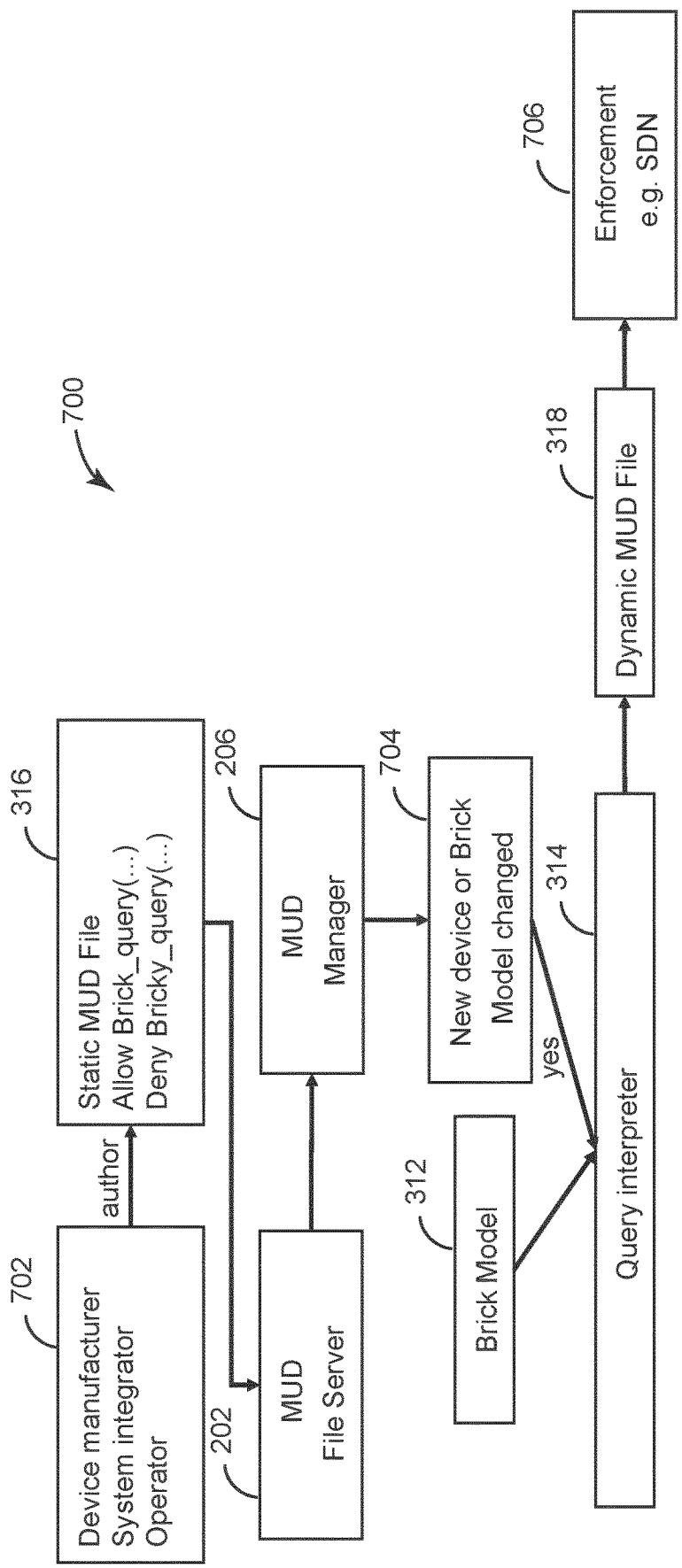
FIG. 7 is a flow diagram of a process for generating and implementing a dynamic MUD file that can be performed by the dynamic MUD manager illustrated in FIG. 3, according to an exemplary embodiment.

Referring now to FIG. 7, a flow diagram of a process 700 for generating and implementing a dynamic MUD file that can be performed by the dynamic MUD manager 326 of FIG. 3 is shown, according to an exemplary embodiment. The dynamic MUD manager 326 can be configured to implement the process 700. Furthermore, the MUD file server 202, the building model system 302, and/or the building network devices 304 can be configured to perform the process 700.

In step 702, a manufacturer, system integrator, or operator can generate a MUD file, e.g., the MUD file 316. The MUD file 316 can be generated to reference building model file queries (e.g., BRICK queries) instead of static references to static device or other entity. The MUD file 316 can be uploaded to a MUD file server 202 and associated with a particular URL and a particular device.

The MUD manager 206 can retrieve the MUD file 316 from the MUD file server 202. In some embodiments, the MUD manager 206 receives a URL emitted from the particular device within the building network devices 304. In response to receiving the URL, the MUD manager 206 can retrieve the MUD file from the MUD file server 202 based on the received URL. The MUD manager 206 can further receive a building model 312. The building model 312 can be a BRICK model that defines particular devices and device relationships of a building. The queries of the MUD file can reference the devices and/or device relationships of the building model 312.

In step 704, the query interpreter 314 can determine whether the MUD file is for a new device (e.g., the query interpreter 314 can identify that the query interpreter 314 has not yet generated the dynamic MUD file 318) or can determine that the building model 312 has been updated (or that the devices referenced in the queries of the MUD file have changed within the building model 312). In response to determining that the dynamic MUD file 318 needs to be generated (e.g. in response to the device associated with the MUD file being new or changes being made to the building model 312), the query interpreter 314 can generate the dynamic MUD file 318. The query interpreter 314 can generate the dynamic MUD policy by interpreting the static query against the building model 312. Interpreting the dynamic MUD policy may indicate which devices to implement particular access policies with. For example, interpreting the dynamic MUD policy may identify a second device that can read data of a first device through a first port of the first device.

In step 706, the dynamic MUD manager 326 can be configured to implement the dynamic MUD file 318 for the building network devices 304. The dynamic MUD manager 326 can be configured to generate and implement configurations for the building network devices 304 to implement the policies of the dynamic MUD file 318. Examples of implementing MUD file policies are described in greater detail with reference to FIG. 2. In some embodiments, the process 700 returns to step 704 where the query interpreter 314 can be configured to determine whether changes have been made to the building model 312 and can regenerate the dynamic MUD file 318 and the dynamic MUD manager 326 can implement new configurations for the dynamic MUD file 318.

Referring now to FIG. 8, the MUD file 316 as described with reference to FIG. 3 including MUD policies and building model queries is shown, according to an exemplary embodiment. The MUD file 316 includes two significant parts, the access information 800 and the building model query 802. The access information can define the security level configuration to permit access or restrict access (e.g., deny certain information) for a particular device from other devices. The building model query 802 defines the other devices in terms of a query of the building model 312. When the query 802 is resolved against the building model 312, specific devices or groups of devices are identified for access or denial of access in the access information 800. The query 802 includes parameters that define the query. In the query 802 the parameters define a particular subclass of sensor, i.e., "Temperature Sensor", define a particular location of the temperature sensor, within a room, and defines the particular subclass of the room, i.e., "Room."

The dynamic MUD file 318 enables the MUD standard for smart buildings. The MUD file 316 resolved to generate the dynamic MUD file 318 facilitates highly optimized security for smart building environments. Device to device access control policies can be specified in building terminology based on type, point, equipment and spatial relation but can also be dynamic with the query 802.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed:

1. A building security system for a building, the building security system comprising:
   one or more memory devices configured to store instructions that, when executed on one or more processors, cause the one or more processors to:
   receive an access policy data structure for a building device, the access policy data structure indicating access policies for interactions of one or more other building devices with the building device, wherein the access policy data structure identifies the one or more other building devices with one or more building model queries;
   generate a dynamic access policy data structure for the building device by resolving the one or more building model queries with a building model to identify the one or more other building devices, wherein the dynamic access policy data structure comprises the access policies; and
   implement the access policies of the dynamic access policy data structure based on the one or more other building devices.

2. The building security system of claim 1, wherein the access policies indicate that:
   the building device should allow a first type of access from at least some of the one or more other building devices to a first network port of the building device; and
   the building device should deny a second type of access from at least some of the one or more other building devices on a second network port of the building device.

3. The building security system of claim 1, wherein the instructions cause the one or more processors to implement the access policies by implementing one or more network configurations on at least one of the building device, the one or more other building devices, or one or more other network devices associated with a network of the building device.

4. The building security system of claim 1, wherein the access policy data structure and the dynamic access policy data structure are both manufacturer usage description (MUD) files.

5. The building security system of claim 1, wherein the building model is a BRICK building model and the one or more building model queries are one or more BRICK building model queries.

6. The building security system of claim 1, wherein the instructions cause the one or more processors to:
   receive, via a network, a resource location identifier from the building device, wherein the resource location identifier is associated with the access policy data structure;
   send, via the network, a request to a file server for the access policy data structure, the request comprising the resource location identifier;
   receive, via the network from the file server, the access policy data structure in response to having sent the request to the file server; and
   generate the dynamic access policy data structure based on the received access policy data structure in response to a reception, via the network from the file server, of the access policy data structure.

7. The building security system of claim 1, wherein the instructions of the one or more memory devices cause the one or more processors to:
  detect a change to the building model; and
  regenerate the dynamic access policy data structure for the building device by resolving the one or more building model queries with the building model to identify at least some of the one or more other building devices or one or more new building devices.

8. The building security system of claim 7, wherein the change to the building model comprises at least one of:
  the one or more new building devices being added to the building model;
  one of the one or more other building devices being removed from the building model; or
  a first building device of the one or more other building devices being replaced with a second building device.

9. The building security system of claim 1, wherein the building model comprises indications of a plurality of entities comprising at least one of one or more building device entities, one or more building device type entities, one or more equipment point entities, or one or more space entities, wherein the building model further comprises relationships between the plurality of entities.

10. The building security system of claim 9, wherein the one or more building model queries identify the one or more other building devices by identifying one or more of the plurality of entities with one or more query parameters.

11. The building security system of claim 10, wherein the one or more query parameters identify the one or more of the plurality of entities by specifying that the one or more of the plurality of entities are associated with a particular entity of the plurality of entities;
  wherein the instructions cause the one or more processors to resolve the one or more building model queries with the building model and the one or more query parameters to identify the one or more other building devices by identifying that the one or more of the plurality of entities that are associated with the particular entity of the plurality of entities.

12. A method of security for a building, the method comprising:
  receiving, by one or more processing circuits, an access policy data structure for a building device, the access policy data structure indicating access policies for interactions of one or more other building devices with the building device, wherein the access policy data structure identifies the one or more other building devices with one or more building model queries;
  generating, by the one or more processing circuits, a dynamic access policy data structure for the building device by resolving the one or more building model queries with a building model to identify the one or more other building devices, wherein the dynamic access policy data structure comprises the access policies; and
  implementing, by the one or more processing circuits, the access policies of the dynamic access policy data structure based on the one or more other building devices.

13. The method of claim 12, wherein the access policy data structure and the dynamic access policy data structure are both manufacturer usage description (MUD) files.

14. The method of claim 12, wherein the building model is a BRICK building model and the one or more building model queries are one or more BRICK building model queries.

15. The method of claim 12, further comprising:
  receiving, by the one or more processing circuits, via a network, a resource location identifier from the building device, wherein the resource location identifier is associated with the access policy data structure;
  sending, by the one or more processing circuits, via the network, a request to a file server for the access policy data structure, the request comprising the resource location identifier;
  receiving, by the one or more processing circuits, via the network from the file server, the access policy data structure in response to having sent the request to the file server; and
  generating, by the one or more processing circuits, the dynamic access policy data structure based on the received access policy data structure in response to a reception, via the network from the file server, of the access policy data structure.

16. The method of claim 12, further comprising:
  detecting, by the one or more processing circuits, a change to the building model; and
  regenerating, by the one or more processing circuits, the dynamic access policy data structure for the building device by resolving the one or more building model queries with the building model to identify at least some of the one or more other building devices or one or more new building devices.

17. The method of claim 12, wherein the building model comprises indications of a plurality of entities comprising at least one of one or more building device entities, one or more building device type entities, one or more equipment point entities, or one or more space entities, wherein the building model further comprises relationships between the plurality of entities.

18. The method of claim 17, wherein the one or more building model queries identify the one or more other building devices by identifying one or more of the plurality of entities with one or more query parameters.

19. The method of claim 18, wherein the one or more query parameters identify the one or more of the plurality of entities by specifying that the one or more of the plurality of entities are associated with a particular entity of the plurality of entities;
  wherein the method further comprises resolving, by the one or more processing circuits, the one or more building model queries with the building model and the one or more query parameters to identify the one or more other building devices by identifying that the one or more of the plurality of entities that are associated with the particular entity of the plurality of entities.

20. A building network security system of a building, the building network security system comprising:
  a building device configured to perform one or more building functions for the building; and
  one or more processing circuits configured to:
    receive an access policy data structure for the building device, the access policy data structure indicating access policies for interactions of one or more other building devices with the building device, wherein the access policy data structure identifies the one or more other building devices with one or more building model queries, wherein the access policy data structure includes an access policy statement, wherein a building model query of the one or more building model queries is embedded within the access policy statement;

resolving the one or more building model queries with a building model to identify the one or more other building devices, wherein the access policy data structure comprises the access policy statement with identities of the one or more other building devices replacing the one or more building model queries; and implement the access policies of the access policy data structure based on the one or more other building devices.

* * * * *